United States Patent
Augst (10) Patent No.: US 7,843,362 B2
(45) Date of Patent: Nov. 30, 2010

(54) METHOD OF CONTROLLING A DRIVING MANEUVER

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 392 days.

(21) Appl. No.: 11/924,167

(22) Filed: Oct. 25, 2007

(65) Prior Publication Data
US 2008/0129544 A1  Jun. 5, 2008

(30) Foreign Application Priority Data
Oct. 26, 2006  (DE) ................ 10 2006 050 550

(51) Int. Cl.
| | |
|---|---|
| B60Q 1/48 | (2006.01) |
| B60Q 1/00 | (2006.01) |
| G08G 1/14 | (2006.01) |
| G03H 1/26 | (2006.01) |
| G03H 1/00 | (2006.01) |
| G02B 21/36 | (2006.01) |

(52) U.S. Cl. ............... 340/932.2; 340/435; 340/436; 340/437; 359/22; 359/31; 359/32; 359/33; 359/505

(58) Field of Classification Search .............. None
See application file for complete search history.

(56) References Cited

U.S. PATENT DOCUMENTS

| | | | | |
|---|---|---|---|---|
| 5,406,395 | A | * | 4/1995 | Wilson et al. ............ 359/15 |
| 5,596,368 | A | * | 1/1997 | Capper et al. ........ 348/333.01 |
| 6,825,880 | B2 | | 11/2004 | Asahi et al. |
| 7,012,548 | B2 | | 3/2006 | Ishii et al. |
| 7,075,456 | B2 | * | 7/2006 | Tanaka et al. ........... 340/932.2 |
| 7,366,595 | B1 | * | 4/2008 | Shimizu et al. ............ 701/301 |
| 7,606,644 | B2 | * | 10/2009 | Kato et al. .................. 701/36 |
| 2006/0190147 | A1 | * | 8/2006 | Lee et al. ................... 701/26 |
| 2006/0202984 | A1 | * | 9/2006 | Yang et al. ................. 345/419 |
| 2007/0100543 | A1 | * | 5/2007 | Kato et al. ................. 701/208 |

FOREIGN PATENT DOCUMENTS

| | | |
|---|---|---|
| DE | 100 65 327 A1 | 8/2001 |
| DE | 100 45 616 A1 | 3/2002 |
| DE | 103 31 235 A1 | 2/2005 |
| DE | 601 05 684 T2 | 2/2005 |
| DE | 10 2005 023 177 A1 | 11/2006 |

OTHER PUBLICATIONS

German Search Report dated Feb. 2, 2007 with English translation (Nine (9) pages).

* cited by examiner

Primary Examiner—Daniel Wu
Assistant Examiner—Fekadeselassie Girma
(74) Attorney, Agent, or Firm—Crowell & Moring LLP (57) ABSTRACT

A method is provided for controlling an at least partly automatically implementable driving maneuver by which a motor vehicle can be moved from an actual position into a desired position. In the environment of the motor vehicle, a virtual target object is generated in a target position for the motor vehicle in the environment of the motor vehicle by projection using projection devices provided on the motor vehicle. As a function of operating actions of an operator of the motor vehicle, the target position is changed, whereby also the target object is displaced in the environment of the motor vehicle. And, by way of a selecting action of the operator, the changed target position is selected and utilized as the desired position of the driving maneuver.

20 Claims, 2 Drawing Sheets

METHOD OF CONTROLLING A DRIVING MANEUVER

BACKGROUND AND SUMMARY OF THE INVENTION

The invention relates to a method of controlling an at least partly automatically implementable driving maneuver by which a motor vehicle can be moved from an actual position into a desired position.

One such method is described in the commonly owned German patent application having File Number 102006026092.9.

The present invention advantageously further develops or modifies such a method.

The method according to the invention controls an at least partly automatically implementable driving maneuver by which a motor vehicle can be moved from an actual position into a desired position. In the environment of the motor vehicle, the method generates a virtual target object in a target position for the motor vehicle in the environment of the motor vehicle by projection using projection devices provided on the motor vehicle. As a function of operating actions of an operator of the motor vehicle, the method changes the target position, whereby also the target object is displaced in the environment of the motor vehicle. By way of a selecting action of the operator, the method selects the changed target position and takes it over as the desired position of the driving maneuver. Advantageous embodiments and further developments of the present invention are described and claimed herein.

In contrast to the disclosure of German patent application 102006026092.9 the virtual target object is not, or not exclusively, displayed on a display unit in the vehicle interior. Instead or in addition, the virtual target object is generated according to the invention by projection devices provided on the motor vehicle as a projection object directly at the target position in the environment of the motor vehicle. The projection site, at which the virtual target object is generated, is therefore situated outside the motor vehicle. The virtual target object is generated as a light phenomenon in a location where it is to be perceived by the driver.

The wording "virtual target object" has the purpose of expressing that it is not an object in the sense of a solid body but only a light phenomenon. For reasons of simplicity, only the term "target object" will be used in the following. However, this applies only to a target object having such a virtual character.

The target position in the sense of the invention preferably is an end position of a driving maneuver that is the goal of the maneuver. A parking space may, for example, be the target position. The present invention naturally also includes a case in which the target position is a targeted intermediate position of a driving maneuver. However, this case can be considered as a linking of several driving maneuvers, one of which ends at the target position. The target position can, therefore, simply still be considered the intended end position of a driving maneuver.

In many cases, the mode of displaying the target object according to the invention offers an advantageous alternative to other forms of display, for example, to projection onto the windshield in the case of a so-called head-up display (HUD).

On the one hand, a projection at a projection site outside a motor vehicle can be designed such that it is also visible to other traffic participants. The other traffic participants can thereby be informed with respect to an imminent parking maneuver, turning maneuver or maneuvering, and to a possible space requirement of the projecting motor vehicle. If the invention is used during a parking maneuver, the intended parking space can also be reserved as a result of the generated projection object in a manner that is recognizable by other traffic participants.

Another advantage of generating the target object according to the invention as the projection object directly in the target position in comparison to other display forms is, on the other hand, that, under certain circumstances, in a simpler and/or improved manner, a display can be implemented which, from the observer's viewpoint, is correct or precise with respect to the position (relative to elements of the real vehicle environment). This becomes possible by generation of projection objects outside the motor vehicle in a simpler or improved manner because the projection according to the invention does not depend, or does not depend to the same extent as, for example, a projection onto the windshield on the viewer's eye position and/or viewing angle. Thus, for implementing the invention, as a rule, also no devices are required for detecting the observer's eye position and/or viewing angle.

For example, in connection with night vision systems and in connection with systems for the highlighted display of traffic signs, augmentation methods are known by which an object situated outside the vehicle is optically highlighted for the driver, in that visual information is projected onto the windshield of the motor vehicle in such a manner that it is shown to the driver of the motor vehicle as an arrow in the direction of the object or as a bordering around the object. However, when the driver moves his head to the side and when this movement is not taken into account by the respective system, the projected information will not appear in the correct position in the augmented overall image from the driver's viewpoint. When corresponding visual information (here, for example, an arrow, a circle or, in the case of a corresponding optical distortion, an ellipse) is, however, generated as a projection object in the environment of the motor vehicle, the overall image shown to the driver of the motor vehicle is largely independent of his eye position inside the motor vehicle.

In contrast to the display of the target object on an onboard monitor or a comparable display unit, the invention has the advantage that the operator does not have to look away from the environment in order to look at the onboard monitor. Instead, he sees the target object directly in the target position.

In the following, the invention, further advantages of the invention as well as advantageous embodiments and further developments of the invention, are described in detail—embedded in basic considerations concerning generation of projection objects by projection devices provided on a motor vehicle. The plurality of the mentioned embodiments for generating projection objects by way of projection devices provided on a motor vehicle can also be used advantageously, particularly in the special context of the invention.

The generation of projection objects by projection devices provided on the motor vehicle can be advantageous in many usage situations. The following explanations apply also and particularly to projection objects which are used as target objects or auxiliary objects in the case of the method according to the invention. Auxiliary objects of the method according to the invention, in particular, are control arrows for illustrating displacement directions of the target object.

By generating at least one projection object by use of a projection device provided on a motor vehicle, at least one probable future location of the motor vehicle can be marked. In particular, it can be marked at least in a plane manner. In particular, a plane marking illustrates to the observer in a factual or simple and clear fashion, which consequences are to be expected from the probable future stay of the motor vehicle at the respective site. In this case, an at least plane marking is any marking which defines a certain surface area—particularly on the road but, as an alternative, also on a different projection surface or floating in free space—or a certain region in the three-dimensional space. The marking may consist of the fact that the respective surface area or the region in space is optically solidly filled or is filled by a pattern. As an alternative or in addition, the respective surface area or the region in space can also be defined by an optical bordering (or in another manner.) Particularly by use of an at least plane marking, for example, an observer in the motor vehicle can estimate, for example, whether a parking space has, in fact, the space required for the motor vehicle and whether it can be reached without a collision. In contrast, the mere display, for example, of a linear movement trajectory of the center of gravity of the vehicle or a, for example, arrow-type marking of a moving direction, in many situations, only provides reduced informational value. Thus, by means of a plane marking, the space requirement of the motor vehicle during an imminent driving maneuver can be characterized in a particularly informative manner. In this case, a driving maneuver is particularly a park-in maneuver, a turning maneuver and/or a maneuvering.

Preferably, the target object therefore has at least a plane construction in the case of the method according to the invention.

A projection object in the sense of the invention is any light phenomenon occurring outside the motor vehicle, which is caused by the projection devices provided in the vehicle. Projection devices in the sense of the invention are not conventional vehicle headlights and vehicle lamps which are used mainly for illuminating the environment of the vehicle (such as low-beam light and high-beam light) or which are used for better recognizing the vehicle without emitting light in a targeted manner to a projection site in the environment of the vehicle (such as rear lights).

The projection can be implemented such that a generated projection object—particularly the target object and/or certain auxiliary objects—are visible only to occupants of the projecting vehicle, particularly the driver, but are invisible or at least difficult to recognize for other traffic participants. In this manner, the possibly existing need of the driver of not sharing his planning—to the extent that the at least one projection object concerns such planning—and/or information displays of his vehicle with other traffic participants can be taken into account. It may possibly be avoided in this fashion that other traffic participants are disturbed or irritated by projections. For example, by using infrared projection techniques, a projection can be achieved that is visible exclusively to the driver. However, other projection techniques are also contemplated, such as the use of polarized light. The driver and possibly additional occupants of the projecting vehicle can then be enabled by the use of auxiliary optical devices to see projection objects which are essentially invisible to other traffic participants. For example, special filters, which preferably are to be mounted on the windshield of the motor vehicle, or a camera with a picture reproduction unit disposed on the output side for reproducing the possibly post-produced camera picture can be used as auxiliary optical devices. The auxiliary optical devices should be appropriately adapted to the special used projection technique—for example, an infrared camera can be used for making projection objects visible which are generated by an infrared projection.

According to a preferred embodiment of the invention, by use of the projection devices provided on the vehicle, in addition to the target object, at least one auxiliary object is generated which is used for the driver information. The generating of the at least one auxiliary object takes place such that the at least one auxiliary object is essentially invisible to other traffic participants without auxiliary optical devices. In contrast, the at least one auxiliary object essentially invisible to other traffic participants can be made visible to the driver of the projecting motor vehicle.

Within the scope of the disclosure, the cases of a difficult recognizability and of a complete invisibility are combined in the expression "essentially invisible." Unless it is explicitly indicated differently, "essentially invisible" will be meant in the following, when the word "invisible" is used. When visibility "exclusively" for the driver is addressed, this means that the respective information is "essentially invisible" to persons outside the vehicle. For reasons of completeness, it should be mentioned that invisibility in the present context naturally does not mean the case of obstructing an observer's view of the projection object. What is meant is, for example, the invisibility of a light phenomenon because of the wavelength or polarity of the light contributing to the light phenomenon.

The projection can be implemented such that the generated projection objects are also or even exclusively visible to other traffic participants. When the projection is designed such that it is visible to other traffic participants, by means of the projection, for example, a required space in the vehicle environment—such as a parking space, can be visually recognizably marked and, as it were, can thereby be reserved.

Advantageously, the projection may also be designed such that several projection objects are generated and that only some of them will be visible to other traffic participants while others of the generated objects are invisible to other traffic participants. In contrast, for the driver of the projecting motor vehicle, preferably all generated projection objects will be visible. Thus, for example, an essential core information (such as the target object according to the invention, for example, for marking a parking space) may be visible to the driver as well as to other traffic participants, whereas additional information (such as maneuvering instructions to the driver) or auxiliary objects (such as control arrows for indicating an operating possibility) are only reserved for the driver.

A projection object which is invisible to other traffic participants may consist of only one object part. If this object part is invisible, the entire projection object will be invisible. Likewise, naturally also a single projection object may have several object parts, at least one object part being visible to other traffic participants, while at least one other projection part is invisible to the other traffic participants. A projection object may, for example, consist of a symbolic object part and a marking as an additional object part. The symbolic object part can then be visibly displayed to all traffic participants, while the marking is visibly displayed only to the driver of the projecting vehicle.

In the simplest case, the different visibility of various projection objects or object parts can be achieved in that different projection devices are used. Projection objects or object parts visible without auxiliary devices are then generated by first projection devices; projection objects or object parts visible only by use of auxiliary devices (and are otherwise invisible) are generated by second auxiliary devices.

An operating possibility can also be provided by which the driver can influence whether a projection object or an object part thereof is to be visible to other traffic participants. Thus, it can preferably be controlled by way of an operating possibility provided at the motor vehicle whether a projection object or an object part thereof is visible to other traffic participants.

By generating a projection object outside the motor vehicle, for example, a parking space or the maneuvering space required by the motor vehicle for a maneuvering operation or a turning maneuver, can be effectively marked. Thus, during a maneuvering, it can, for example, be indicated to other traffic participants by the projection of a band (or driving tube)—preferably having approximately the width of the motor vehicle—onto the road surface, into which areas of the road they should not penetrate in order to avoid a collision with the projecting vehicle or to permit the projecting vehicle to maneuver in an undisturbed manner.

A plane marking that marks a vertical projection of the space likely to be taken up by the motor vehicle on the road in the future is particularly advantageous. It may, therefore, be advantageous to construct the target object in the case of the method of the invention such that it indicates approximately the top view of the projecting motor vehicle. However, by way of a targeted addition in the sense of an enlargement of the marked surface, a safety addition may also be provided in a targeted manner.

Preferably, the projection object used for the plane marking (or the projection objects used for this purpose) itself/themselves is/are expanded at least in a plane fashion. As an alternative or in addition, naturally, for example, a linear bordering of a plane area can be used in order to achieve a plane marking. Less energy is used to provide a border for an area to be marked in a plane manner than for a solid optical filling of the surface of the area. Furthermore, a filling by way of a pattern (for example, a hatching) permits a lower-energy plane marking than a solid filling. A broken line (for example, a dotted or dashed line) can be generated by use of lower energy expenditures than a solid line.

A projection is particularly advantageous that presents itself to the observer in a three-dimensional fashion. This can be achieved, for example, in a manner known per se by an essentially two-dimensional projection which, however, is perceived by the observer as being three-dimensional because of perspective display elements. A three-dimensional display—particular for occupants, such as the driver, of the motor vehicle equipped with the projection devices—can also be achieved by many different 3D-display techniques, where it is achieved by auxiliary technical devices (such as shutter spectacles, red-green filters, polarization filters, etc.) that slightly differ—for example, perspectively slightly offset-images—are offered to both eyes of the observer, which creates the effect of a spatial perception. For an improved usability, the mounting of such auxiliary stereo projection devices or auxiliary stereo viewing devices on the windshield of the motor vehicle or their integration into the windshield is suggested. This can be implemented particularly by using one or more polarization filters.

Typically, projection objects are generated in that light is projected onto the surface of a solid (thus, not liquid or gaseous) body. The surface of the solid body is therefore used as the projection surface. However, under certain circumstances and with the aid of suitable techniques, a projection object in the sense of the invention can also be generated at a projection site "in free space" thus not on the surface of a solid body, but, for example, "floating in the air".

Such a projection object generated "in free space" may, for example, have an essentially plane construction or at least appear plane to the observer. For this purpose, for example, a wall of fog can be utilized as the projection surface. In order to achieve a three-dimensional appearance, the use of technologies is particularly advantageous which, in fact, permit the generating of a projection object which already is three-dimensional itself. By use of a projection which is three-dimensional, a three-dimensional display can be presented to a vehicle occupant as well as an observer of the projection who is situated outside the motor vehicle, for example, a traffic participant. At the same projection site, because, by way of the techniques described in the following, presentations can be implemented whose three-dimensionality is almost independent of the observer's viewing angle. Such a three-dimensional projection is particularly advantageous because of its realistic spatial appearance, which may result in the observer's high attention and in an effective providing of information. Since such a three-dimensional projection typically protrudes spatially from the plane of the road or "floats" above the latter, it is particularly recognizable and not likely to be covered. In the case of the method of the invention, a three-dimensional formation of the target object is therefore particularly advantageous.

Such a three-dimensional projection can be technically implemented, for example, by holographic projection, for example, by use of coherent light sources (lasers). In a manner known per se from the state of the art, coherent light sources required for the holographic projection can be generated, for example, by splitting a laser beam using a semi-transparent mirror.

As required, an especially further developed medium can be created for the projection at the projection site, the projection then taking place into or onto this medium. As an alternative or in addition, a boundary of two media with different optical characteristics can also be created at the projection site. Particularly, the boundary between the two media may then have suitable optical features for generating a projection object there.

According to a particularly advantageous embodiment of the invention, a holographic projection is carried out upon one or more ultrasound wave fronts. The ultrasound wave fronts are preferably controllable with respect to their spatial arrangement. In this case, by use of standing ultrasound waves generated especially for this purpose or a spatial arrangement of such standing ultrasound waves, non-homogenous wave-optical characteristics of a medium can be created. By means of this inhomogeneity, the coherent light sources used for the holographic projection can form a defraction pattern at defined sites in space. These sites in space therefore act themselves like light sources in space (compare physical effect of the defraction), whereby, from an observer's viewpoint, a three-dimensional object floating in space can be formed. A suitable ultrasound wave front can be created, for example, by way of also coherent, mutually synchronized ultrasound signal generators. Such ultrasound signal generators can generate standing waves in a medium (for example, in water or—for the present application of a higher relevancy—in air), which waves, as required, are also spatially displaceable. In that the air pressure, as a result of the waves, is non-uniformly distributed at the corresponding sites in space, certain changes also occur for the optical characteristics of the corresponding sites. Particularly, minimums or maximums are formed with respect to certain optical characteristics. The resulting inhomogeneity can be utilized as the medium, figuratively "crystallization centers", for forming a defraction pattern.

According to another advantageous embodiment of the invention, a holographic projection can also be generated on a heat front created at the projection site. The heat front can be created by influencing the local temperature of the air at the projection site by use of corresponding technical devices, particularly by use of devices for heating the air (for example, by means of an additional invisible controlled laser beam or several laser beams focused onto a plane in space). By way of such techniques, water vapor or fog can, for example, be generated locally because the water droplets in the air can be heated—for example, by using a laser beam. A "wall of fog" which can be generated in such a manner can be used as a projection surface for a projection according to the invention.

The motor vehicle preferably itself includes suitable devices for creating an especially developed projection medium (for example, for generating an ultrasound wave front or for another creation of wave-optical inhomogeneities) and, as required, for controlling its spatial arrangement. For example, suitable ultrasound signal generators may be provided for this purpose on the motor vehicle. As a result of the possibility of controlling the spatial arrangement, the projection medium can be created where a projection object is to be generated. With suitable control, the motor vehicle will then independently be capable of generating three-dimensional projection objects by a corresponding projection technique. However, it is also contemplated that a suitable projection medium is made available at typical projection sites (for example, on large parking spaces or in a parking garage) by use of a stationary device, which projection medium can then be used by all traffic participants who pass by such a projection site.

A projection object generated "in free space" may essentially have a two-dimensional or three-dimensional construction. Under certain circumstances, the visibility of a two-dimensional projection object can also be improved when the projection does not take place onto a projection surface but when the projection object, as required, by using a projection medium, such as an ultrasound wave front, is generated in free space as it were in a "floating" manner. Thus, for example, also two-dimensional (not only as a result of their perspective view but in reality) projection objects projecting from the driving plane can be generated.

Generally—that is, also in the case of three-dimensional projections, but particularly also in the case of two-dimensional projections—it may be advantageous with respect to projection objects which, depending on the observer's viewing angle, could present themselves to the observer in a distorted manner, to take the viewing angle of the respective observer into account during the projection such that at least an approximately correct (undistorted) image is obtained from the respective viewing angle. The taking into account may consist particularly of an intentional distortion of the image to be projected, which compensates the viewing-angle-dependent perspective distortion when observing the projection object. In a completely different context, such an approach is known, for example, for advertisements which are fixedly mounted on a playing field of sports arenas and which are adapted to a certain camera perspective such that they appear undistorted in the camera image. If the observer's viewing direction onto the at least one projection object generated according to the invention is known, for example, in the case of another traffic participant whose position is detected by the surroundings-directed sensor system of the motor vehicle or is reported by vehicle-to-vehicle communication, then it is advantageous to take into account the known viewing direction in a manner known per see during the projection. Otherwise, assumptions can be made with respect to a viewing angle (for example, according to the map material of a navigation system). As an alternative, particularly when it is not known in which direction an observer may be situated or when several possible directions are to be taken into account, several representations can be projected simultaneously which are each adapted to a certain observation angle or observation angle range. Thus, it is highly probable that at least one of the representations can be easily recognized and is informative to the observer looking from an unknown viewing angle. As required, a taking into account of the observer's viewing angle by a corresponding distortion may relate to all generated projection objects or only to individual generated projection objects. Particularly, for representation elements which are to lift themselves out of the projection plane in the observer's perception, such a form of representation is advantageous.

The generation of projection objects by projection devices provided in the case of a motor vehicle can be used particularly advantageously for displaying an imminent driving maneuver of a motor vehicle. In this case, preferably, at least one probable future location of the motor vehicle during and/or at the end of a driving maneuver is marked. According to the invention, this can particularly be the target position. In this context, a driving maneuver particularly is a park-in maneuver, a maneuvering and/or a turning maneuver. Such an imminent parking maneuver may—as is largely a condition of the invention—be based on planning by the driver or on an automatic planning, for example, by way of a driver assistance system. A number of future locations of the motor vehicle which can be marked by one or more projection objects, in addition to a target position, may also be a trajectory for a planned driving maneuver, particularly a parking maneuver, a maneuvering, or a turning maneuver. The marking of such a trajectory preferably takes place at least in a plane manner. As described above, the required space is thereby represented particularly clearly.

In certain driving maneuvers, particularly during a parking maneuver, it may be particularly advantageous to mark a target position by projection, which the motor vehicle is to reach or will reach at the end of the driving maneuver. In order to comply with the typical linguistic usage, according to which a certain arrangement and/or alignment of a motor vehicle is called a position, the term target position is used here. However, preferably, the target position is marked at least in a plane fashion and should not be understood to be, for example, punctiform. Particularly the generating of one or more projection objects is considered which optically mark the surface area of the motor vehicle in the target position. Beyond the mere effect of the information on the driver, by marking a target position of a parking maneuver, for example, a targeted parking space can also be reserved in a manner recognizable to other traffic participants. Conversely, as required, the projection can also be implemented and/or be adjusted by the driver such that it is visible only to the driver or occupant of the projecting motor vehicle. For example, in certain situations, it may be in the interest of the driver to make his parking intention specifically not recognizable to other traffic participants.

Preferably, at least one generated projection object, particularly a projection object which, according to the invention, marks the target position of a driving maneuver, can be changed by an operating action of the driver relating to the projection object such that a changed probable future location of the motor vehicle is defined or marked. The change of the marked probable future location of the motor vehicle, as required, caused by an operating action of the operator may particularly consist of the fact that the projection location or the projection site of the at least one projection object generated according to the invention is changed.

In addition to the target position, a road band (or driving tube, trajectory) marking the required maneuvering space can be marked or reserved for the driving maneuver by projection.

In this case, it may make sense to permit the driver to change the path on which the motor vehicle is to reach the target position. In such a case, it may be advantageous to allow the driver to change the shape of the road band by means of operating actions.

For implementing such embodiments of the method according to the invention, as required, a suitable operating element for detecting the operating actions of the driver may be provided in the motor vehicle.

The invention represents a further development or modification of the teaching of the commonly owned German patent application 102006026092.9, the entire disclosure of which is hereby incorporated by reference. The generating of the target object according to the invention as a projection object outside the motor vehicle in the real vehicle environment can take place as an alternative or in addition to the representation of a target object on a display unit in the vehicle interior known from German patent application 102006026092.9. The target object can then preferably by at least one operating action of the driver be displaced such that it finally marks a desired end position of a driving maneuver, particular a desired parking position.

In this manner, the driver is preferably provided with the possibility of displacing a projected target object, which marks an end position of a parking maneuver that can be carried out fully automatically or partly automatically, into a desired parking position, or of selecting one of several possible parking positions.

A further development of the teaching of the German patent application 102006026092.9 may particularly be present in that, in addition to the present invention, the display disclosed there can take place on a display unit in the interior of the motor vehicle.

German patent application 102006026092.9 describes mainly a method of controlling an at least partly automatically implementable park-in operation by which a motor vehicle can be moved from an actual position into a desired position, with the acts of: (i) displaying an image of the environment of the motor vehicle by way of a display unit in the interior of the motor vehicle; (ii) showing a virtual target object in the environment image, whose image position in the environment image corresponds to a target position for the motor vehicle in the environment of the motor vehicle; (iii) as a function of operating actions of an operator of the motor vehicle, changing the image position of the target object in the environment image; and (iv) as a result of a selecting action of the operator, selecting the changed image position of the target object and, and taking over a target position for the motor vehicle which corresponds to the changed image position of the target object, as the desired position of the park-in operation.

By means of the transition according to the invention to the generating of the target object as the projection object in the environment of the motor vehicle and the generalization to other driving maneuvers (achieved in patent application DE 102006026092.9 by clarifying the description), the following is obtained. A method of controlling an at least partly automatically implementable driving maneuver by which a motor vehicle can be moved from an actual position into a desired position, with the acts of: (i) in the environment of the motor vehicle, generating a virtual target object by projection using projection devices provided on the motor vehicle, the position of the virtual target object in the environment corresponding to a target position for the motor vehicle in the environment of the motor vehicle; (ii) as a function of operating actions of an operator of the motor vehicle, changing the position of the target object in the environment; and (iii) by way of a selecting action of the operator, selecting the changed position of the target object and taking over a changed target position for the motor vehicle, which corresponds to the changed position of the target object, as the desired position of the driving maneuver.

The above description of the method mentions a correspondence between the position of the target object in the environment and the target position for the motor vehicle (because, as a rule, there is a certain deviation between the actual target position for the motor vehicle and the corresponding position of the target object). Under the simplifying assumption of an ideal projection (in which: target position=position of the target object), the method can be described even more clearly as a method of controlling an at least partly automatically implementable driving maneuver by which a motor vehicle can be moved from an actual position into a desired position, with the acts of: (i) in the environment of the motor vehicle, generating a virtual target object in a target position for the motor vehicle in the environment of the motor vehicle by projection using projection devices provided on the motor vehicle; (ii) as a function of operating actions of an operator of the motor vehicle, changing the target position, whereby also the target object is displaced in the environment of the motor vehicle; and (iii) by way of a selecting action of the operator, selecting the changed target position and taking it over as the desired position of the driving maneuver.

Special embodiments of the invention—in addition to being contained in the present specification—are analogously indicated to a person skilled in the art in embodiments described in German patent application 102006026092.9. Reference is hereby explicitly made to the respective characteristics disclosed in German patent application 102006026092.9. For understanding these characteristics, the respective specification parts and drawings of German patent application 102006026092.9 should be considered.

In particular, it may be advantageous to at least once carry out an automatic interpretation of the environment of the motor vehicle to be parked in order to at least determine a permissible and/or preferred target position. Such a permissible and/or preferred target position can then be used as the starting point for further changes of the target position which the driver can make by corresponding operating actions.

Another preferred embodiment consists of determining, as an alternative or in addition, by an automatic interpretation of the environment, a first and a second target position and displacing the target object by an operating action from the first target position into the second target position. The driver can then very easily make a selection between several permissible and/or preferred target positions. In this case, an optical marking generated by projection can "jump back and forth" between several conceivable target positions, particularly parking positions.

Another preferred embodiment consists of designing, as an alternative or in addition, the target object such that its representation in the environment clearly projects at least partially upward beyond the plane of the road.

Another preferred embodiment consists of graphically designing, as an alternative or in addition, the target object such that it represents a virtual motor vehicle in the environment. In this case, the target object can be designed particularly advantageously when it is generated as a three-dimensional projection object, as required, while utilizing a projection medium generated for this purpose at the projection site.

Another preferred embodiment consists of further developing, as an alternative or in addition, the target object completely or partially in a semitransparent manner.

Another preferred embodiment consists of the fact that, as an alternative or in addition, the graphic representation of the target object in the environment takes place at least partially as a function of the brightness and/or the color of surrounding objects in the environment.

Another preferred embodiment consists of, as an alternative or in addition, emitting a direct haptic acknowledgement to the user by way of an operating element used for the operation or selection, and/or relating the operator's operating actions at least partially to a rotary-type/pressure-type actuator.

Another preferred embodiment consists of making visible a trajectory leading to the actually adjusted target position and/or a required maneuvering space, in addition to generating the target object in the vehicle environment according to the invention—also by generating at least one projection object. Route sections can therefore be marked which are required for a driving maneuver and which therefore probably are traveled during the driving maneuver and therefore should not be traveled or entered by other traffic participants in order to avoid a collision.

In particular, it may be advantageous for the user to be enabled to choose between several possible trajectories to a single target position.

Another preferred embodiment consists of obtaining, as an alternative or in addition, data with respect to a possible target position and/or with respect to determining a trajectory by wireless communication from a data bank outside the motor vehicle.

The present invention offers the driver, among other things, the advantage that he does not have to direct his view to a display unit inside the vehicle but can directly observe the real setting relevant to the driving maneuver. It may be advantageous to design the projection such that it is also visible to other traffic participants. A parking space can thereby be reserved by the motor vehicle equipped with the projection devices in a manner that is visible to the other traffic participants.

However, if the driver does not want to share or only partially wants to share the shown information with other traffic participants, it may be advantageous to implement the target object or a part thereof and/or certain auxiliary information (for example, control arrows or numerical data) in a manner that is invisible to other traffic participants. The same applies when other traffic participants are not to be irritated by the projection.

The above description is partially tailored especially to parking maneuvers. Advantages are also obtained for other fully or partially automatically implemented maneuvering and turning maneuvers. It may be advantageous for the space requirement of the motor vehicle for a maneuvering or turning maneuver to be marked by a projection which can be recognized by other traffic participants. As an alternative or in addition, specifically a visualization according to the invention of corresponding information of the maneuvering or turning maneuver can be advantageous that is also or exclusively intended for the driver of the motor vehicle equipped with the projection devices.

According to a further development of the present invention, for testing or preparing a driving maneuver, at least one control element of the motor vehicle (such as the steering wheel, the accelerator, the brake), ideally even all control elements relevant to the driving maneuver, is uncoupled from the pertaining driving elements (for example, engine, steering system), so that the driver can carry out an operation of the at least one uncoupled control element which is aimed at the respective driving maneuver, without already moving the vehicle or influencing its movement. Instead, as a result of the operation of the at least one uncoupled control element carried out by the driver, a projection object generated according to the invention in the environment of the motor vehicle is changed, particularly moved or displaced. Preferably, as a result of the operation of the at least one uncoupled control element carried out by the driver, the target object of a parking maneuver generated by projection is controlled or displaced. Thus, the driving maneuver can be tested beforehand by the driver without risk. An uncoupling of control elements and driving elements required for this purpose can be implemented relatively easily in modern and future motor vehicles by using so-called X-by-wire techniques.

It is particularly advantageous for control signals, which the driver generates by operating the control elements, to be recorded during the testing in such a further development of the present invention, and for these control signals—in the case of a successful testing—to be subsequently retrievable for the implementation of the corresponding real driving maneuver. The control signals generated by the operation of the control element in the uncoupled condition can therefore be used at a later point in time for an actual movement of the motor vehicle. The driver can therefore first "virtually test" a difficult maneuver and then actually carry it out subsequently only in the event of a success "by pressing a button".

As a rule, the driving maneuver "virtually tested" according to such a further development of the present invention starts with the actual physical position of the own motor vehicle. Here, it may be difficult for projection-related reasons to generate the target object by projection already at a short distance from the motor vehicle. In such cases, it is advantageous to generate the target object by projection only when it is already at such a distance from the motor vehicle that it can be represented by projection. In contrast, a possible recording of the control signals preferably starts already in the initial position in order to be able to reproduce the entire driving maneuver.

Possibly recorded control signals are preferably processed by computer and/or checked for collision avoidance. They may also be changeable by the driver, particularly after the end of the virtual maneuver and before the clearing of the corresponding physical maneuver. It is advantageous for a change to be implementable here and there instead of completely. For example, no complete change of the recorded control signals then has to take place. In addition, the planning of the maneuver is facilitated for the driver because he can direct his attention to details without significantly changing the overall maneuver.

In addition to or instead of control signals, physical movement parameters, such as trajectories or a vector-based model of the driving maneuver in the uncoupled condition can be recorded in order to later reproduce the virtually implemented maneuver.

The control signals (or other parameters) of a driving maneuver recorded in this manner can also be stored for a later repetition (for example, the daily complicated exit from a garage) or can simply be stored for recording purposes.

The control signals (or other parameters) of a thus recorded driving maneuver may also be used for the wireless alignment with virtual or probable driving maneuvers of other means of transport in the surroundings. For example, effective accident prevention can be achieved in this manner.

For overcoming various disadvantages of the state of the art in the field of driving maneuver assistance systems in the case of motor vehicles, different improvement possibilities are suggested in the following. The improvement possibilities are used for overcoming individual or all of the following disadvantages:

(a) In the case of complex driving maneuvers (for example, maneuvering, parking, turning), the signaling of the driver's intention to the other traffic participants is often insufficient in methods and systems according to the state of the art. A driver can also not always exactly assess the implementability of his driving maneuver—even when his motor vehicle has modern camera-based driver assistance systems.

(b) The driver assistance graphics known from the state of the art, such as auxiliary graphics or "space holders" for the own vehicle, which can be computed for the driver by a (partially) automatic parking assistance system, are shown only for vehicle occupants on a video screen or a comparable display device. Such systems therefore only assist the vehicle occupant. In addition, misunderstandings in the interpretations of the maneuvering intention on the part of other traffic participants are conceivable (for example, during parking-in maneuvers and maneuverings which are composed of several partial route sections). When the driver directly observes the environment of the motor vehicle, in the case of methods and system according to the state of the art, he is also no longer assisted by the graphics of a driver assistance system which are, for example, displayed on a video screen in the vehicle interior.

For overcoming such disadvantages, the method according to the invention can be used, by which at least one target object is inserted as a projection object into the environment of the motor vehicle. In addition to the target object as required, additional elements of an implementable or planned driving maneuver can be inserted in the environment of the motor vehicle as projection objects.

The above-mentioned "elements" of a driving maneuver may include, for example, space holders for one's own vehicle, symbols, direction arrows and/or other objects, which can be generated by projection and which can be used, for example, for the symbolic description of a maneuver. Particularly parking maneuvers, maneuvering and turning maneuvers are considered to be "driving maneuvers." These may be intended by the driver and/or be based on a fully automatic or partially automatic planning by a corresponding planning system of the motor vehicle.

The projection devices used according to the invention may be composed of a single projection unit or several projection units. The use of several mutually spaced projection units may be useful for being able to still generate a spatially expanded projection object also close to the vehicle. Multicolored or particularly fast projections also may be achieved more easily if several projection units contribute.

In the case of embodiments of the invention which provide a selective visibility of generated projection objects, particularly of the target object, it may be favorable with respect to equipment that projection objects or object parts visible to all traffic participants are generated by a first projection unit, whereas projection objects or object parts invisible to other traffic participants are generated by another projection unit. In this case, a single projection unit does not necessarily have to generate visible as well as invisible projection objects or object parts.

In a simple further development of a system for implementing the method according to the invention, the generating of the target object and, as required, additional projection objects can be achieved, for example, by a light-related, for example, laser-based projection onto the road. In the simplest case, such a projection may be "drawn" onto the road by use of a guidable laser beam such that an observer has the impression of a two-dimensional or three-dimensional projection object.

According to the invention, the target object and, as required, additional projection objects can also be generated as a projection "floating" in space or as a holographic projection, or as a two-dimensional projection which is perceived as spatial by a human observer.

The generated target object as well as possibly additional generated projection objects can be further developed as a—preferably because of the driver's operating actions—movable virtual object as well as a virtual object which can be inserted only at defined projection sites and is thereby only "location-discretely displaceable".

As mentioned above, conventional vehicle headlights and vehicle lamps, which are used mainly for illuminating the environment of the vehicle, or which are used for an improved recognizability of the vehicle without emitting light in a targeted manner to a projection site in the environment of the vehicle, are not considered to be projection devices in the sense of the invention. The projections according to the invention differ from such conventional optical signaling techniques (for example, also a flasher, indicator) in that the generated projection objects have a defined two-dimensional or three-dimensional shape (for example, with sharp edges) which can be recognized at a distance from the vehicle.

The generation of projection objects by a projection device provided on a motor vehicle can be used particularly advantageously according to the invention when at least one projection object is generated which marks the space required for one's own vehicle in a target position and/or on the route to this target position.

Such embodiments of generating projection objects outside the motor vehicle are particularly useful for driving maneuvers in which the dimensions of the driver's vehicle play a decisive role, particularly therefore during parking-in and maneuvering.

When using the generating of projection objects outside the vehicle in connection with a parking maneuver, preferably at least one projection object is constructed as a parking symbol or contains such a parking symbol. A parking symbol is characterized in that it makes a marked surface area (or a marked area in the three-dimensional space) recognizable for the driver and/or for additional traffic participants as the target position during an intended park-in maneuver. Such a parking symbol can, for example, be inserted on the road, preferably inside a correspondingly marked road area. It can also be represented to be spatially "floating" in space. A parking symbol is particularly suitable which, in its design, is similar to a traffic sign for indicating a parking space, for example, the generally known letter "P" shown alone or in a rectangle.

Other objects, advantages and novel features of the present invention will become apparent from the following detailed description of the invention when considered in conjunction with the accompanying drawings.

DETAILED DESCRIPTION OF THE DRAWINGS

Figure 1:
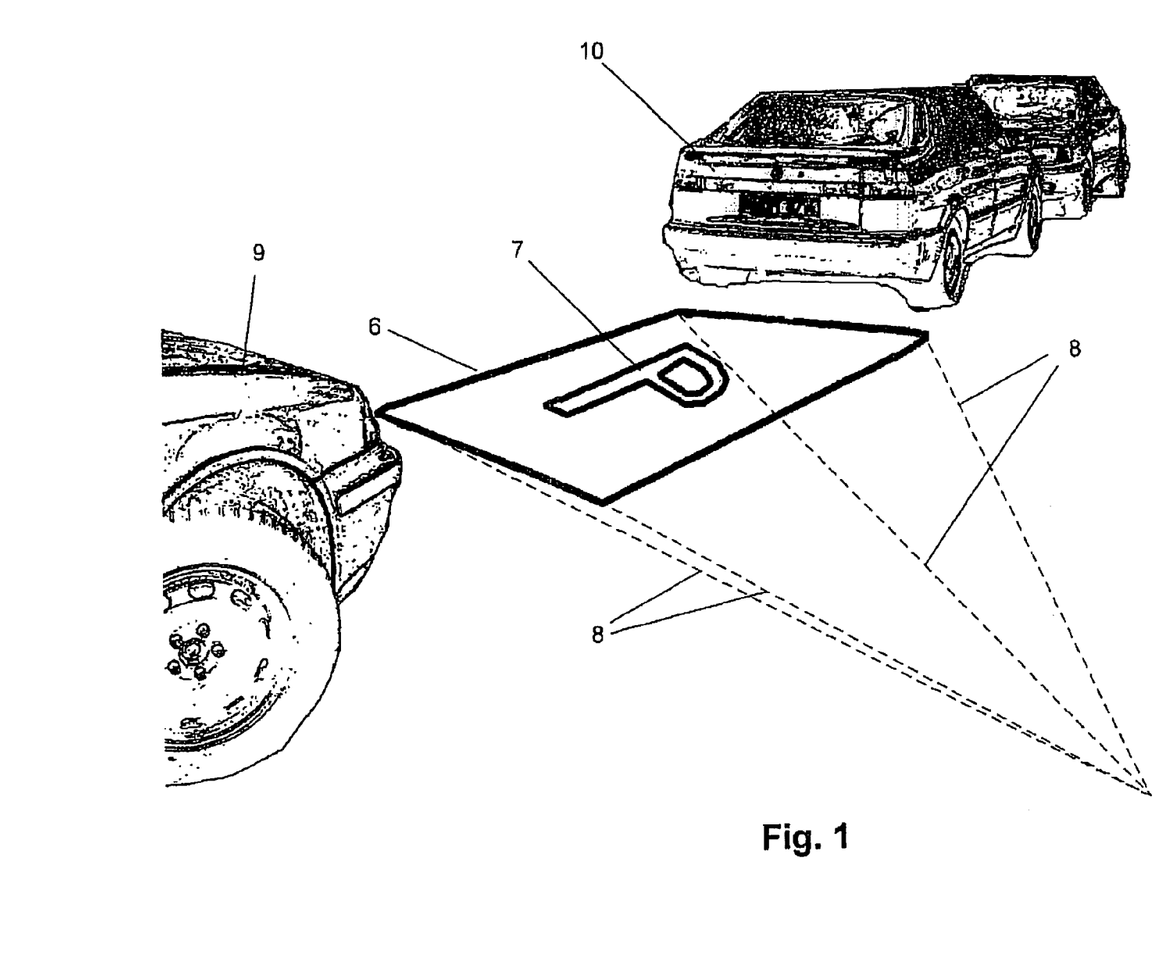
FIG. 1 is a schematic view of a setting environment, in which a motor vehicle marks a probable parking position by projection.

FIG. 1 illustrates an embodiment for the "reservation" of a parking space between two other vehicles 9 and 10 by marking the outline 6 of the parking space and the insertion of a parking symbol 7 into the marked surface. The broken lines 8 show from which direction the projecting motor vehicle generates the generated projection objects.

It may be helpful for such "projection beams" (compare broken line 8 in FIG. 1) to also be visible in the real situation. They can facilitate the spatial orientation for the driver of the projecting motor vehicle. For other traffic participants, an assignment of a projection object to a motor vehicle can be permitted in this manner. However, the "projection beams" 8 do not necessarily have to be constructed to be visible, if the used projection technique allows something else.

Particularly in the case of generating projection objects according to the invention while the motor vehicle is moving, a complete or at least partial compensation of the inherent speed and/or tilt of the vehicle relative to the road preferably takes place. Without additional measures, a generated projection object could unintentionally move on the road, which could make its interpretation difficult for the driver and/or the other traffic participant, or could even divert their attention from the displayed information. However, a projection object can be generated relative to the road as a projection surface but in an almost immobile manner if, during the projection, at least the inherent speed of the vehicle relative to the road is determined mathematically and its effect upon the projection is compensated. For example, for this purpose, the measures known per se from German Patent document DE 197 38 765 A1 for the compensation of pitching and rolling motions can be used correspondingly. Thus, also in the case of generating a projection object by use of a laser beam on the road, a satisfactory compensation can be achieved by way of changing the angle of the laser beam as a function of the inherent speed and, as required, of parameters of the longitudinal and lateral dynamics of the vehicle. Mainly the pitching of the projecting motor vehicle can play an important role because vehicle braking, for example, when approaching an intersection, typically pitches the vehicle forward. Devices for detecting the vehicle movements as well as other physical parameter which are connected to the longitudinal and lateral dynamics of the vehicle, are usually provided anyhow in modern motor vehicles.

The insertion of projection objects according to the invention into the environment of the motor vehicle preferably takes place as a function of the result of a sensor-based analysis of the environment. If an object hinders the projection—particularly when this is a living being which could be endangered by the projection technology used, (for example, could be severely blinded), certain characteristics of the projection (such as the intensity) can be dynamically changed as a function of the results of the sensor-based analysis of the environment, or the projection process can be temporarily interrupted or terminated. It is particularly advantageous that in such a case, as an alternative or in addition, the characteristics of the projection are changed in a locally limited and/or time-limited manner. Should, for example, during a maneuvering, a pedestrian cross a laser beam used for the projection, the projection at the corresponding site spatially selectively and/or in a time-restricted manner can be interrupted or limited in its intensity.

When, as a result of an obstacle detected by the analysis of the environment, a planned driving maneuver cannot probably be carried out without a collision, for warning the driver and/or the other traffic participants, a warning projection object (such as an exclamation mark, as required, also an exclamation mark in a warning triangle or another warning symbol) can be generated. As an alternative or in addition, a warning can also be emitted in that certain characteristics of at least one shown projection object are changed (for example, the color, rapid brightness fluctuations, flashing, etc.).

For carrying out a sensor-based analysis of the environment of the motor vehicle, signal reflections are preferably used for this analysis, which originate from the projection devices used according to the invention for generating the at least one projection object and are reflected on objects of the environment. Different methods are known from the state of the art for analyzing the environment by which the environment is scanned either by use of a laser constructed, for example, as an infrared laser or is illuminated by use of a light pattern further developed, for example, in a grid shape. By way of the resulting reflections from the environment, the environment can be analyzed and can be recorded, for example, as a spatial or so-called 2.5-dimensional map. In this case, for example, so-called "time-of-flight" technologies can be used.

The analysis of the environment carried out in this manner may, for example, concern a detection of obstacles and/or the determination of a course, particularly of a curvature, of the road surface or of an off-road environment. A possibly detected curvature of the road surface may be taken into account during generation of projection objects according to the invention so that, in the case of a projection onto the road, the projection site is appropriately selected and/or distortions as a result of unevennesses of the road are compensated. Particularly when generating the at least one projection object by one or more laser beams, this leads to improved results.

If a laser-based system is used for analyzing the environment of the motor vehicle (for example, also for the general detection of danger and/or the avoidance of collisions), the use of a laser of the same system also for the process according to the invention may be particularly advantageous. The space required in the case of the motor vehicle can thereby be reduced. In addition, costs can be saved.

In a particularly simple manner, the generating of projection objects required for the invention can be implemented outside the motor vehicle if at least one guidably movable laser is used as the projection device or if a mirror, by way of which a laser is deflected, has a guidably movable construction. The direction of a laser beam can, for example, be controlled in that the laser beam is deflected by way of a mirror, which is swivelably constructed by way of a, for example, electromagnetically constructed drive or a drive based on piezo technology. In the case of this simple but functional implementation of a system for generating projection objects outside the motor vehicle, the visual impression of an object is generated in an observer's human perception as a result of a fast movement of one or more laser beams. Thus, also virtual objects can be projected which can be interpreted as three-dimensional spatial shapes. For providing a spatial effect, projection objects may, for example, have different line thicknesses, colors and a "perspective" further development.

Preferably, at least one generated projection object, particularly the target object of a driving maneuver, is designed such that its representation in the environment projects at least partly clearly upward beyond the plane of the road and represents a three-dimensional object or can be perceived as such. As a result, a spatial perception is promoted, and the advantage of an improved recognizability is obtained, particularly from a large distance. Thus the at least one projection object has a higher probability of also being seen by another traffic participant if the latter does not look directly at the road.

As mentioned above, it may be particularly advantageous for the implementation of the invention to use techniques which permit generation of projection objects that can be perceived not only three-dimensionally but have a three-dimensional shape per se. For this purpose, as described above, while utilizing the physical effect of defraction in the space actually only filled with air in the environment of the vehicle, by use of coherent light sources arranged on the vehicle, as it were secondary light sources can be generated. In a corresponding number and spatial arrangement, such secondary light sources, which may also be spatially expanded, may lead to an observer's perception as a projection object in the sense of the invention. Possibilities of the technical implementation of such a generating of secondary light sources were indicated above. A holographic projection may, for example, be used while utilizing controlled interference of coherent light sources on an ultrasound wave front.

As a result of the rapid progress of developments in this field, an increasingly improved uncoupling of the projection from the characteristics of the medium into which it is projected is also achieved. The generating of a suitable medium, such as an ultrasound wave front, which basically can also take place by the projecting motor vehicle, can therefore possibly be eliminated in the future.

The objects, which can be generated in this manner and "float in space" and/or can be freely positioned, have the advantage of a good recognizability also in situations in which a projection, for example, on the road surface would be difficult to recognize. Furthermore, as a rule, such projection objects have an effect that is extremely close to reality. In addition, in contrast to "normal" 3D images, projection objects generated by holographic techniques can be observed from almost all directions as spatial objects irrespective of the observer's position.

Depending on the projection technique, projection objects can be generated that are visible to the human eye and/or those that are invisible to the human eye. By using different techniques, also parts of the overall representation can be generated to be visible to the human eye, while other parts of the overall representation are generated to be invisible to the human eye.

For example, a projection object or a part thereof can be generated by projection in the infrared or ultraviolet spectral region. It will then be visible to a human observer only by using an auxiliary device, such as an infrared camera system or other optical devices, This can result in the advantage that, from the view of other traffic participants, the environment is not "cluttered" with superfluous projection objects. Such superfluous projection objects could irritate the other traffic participants or have an otherwise disturbing effect. In contrast, detailed auxiliary information may be desirable for the driver. Such auxiliary information can therefore, for example, be projected such that it is made visible only by way of a driver assistance camera and pertaining display devices for the driver of the projecting motor vehicle. Simultaneously, another projection object, such as a target object for a driving maneuver, can be generated in such a manner that it is visible to all traffic participants.

Figure 2:
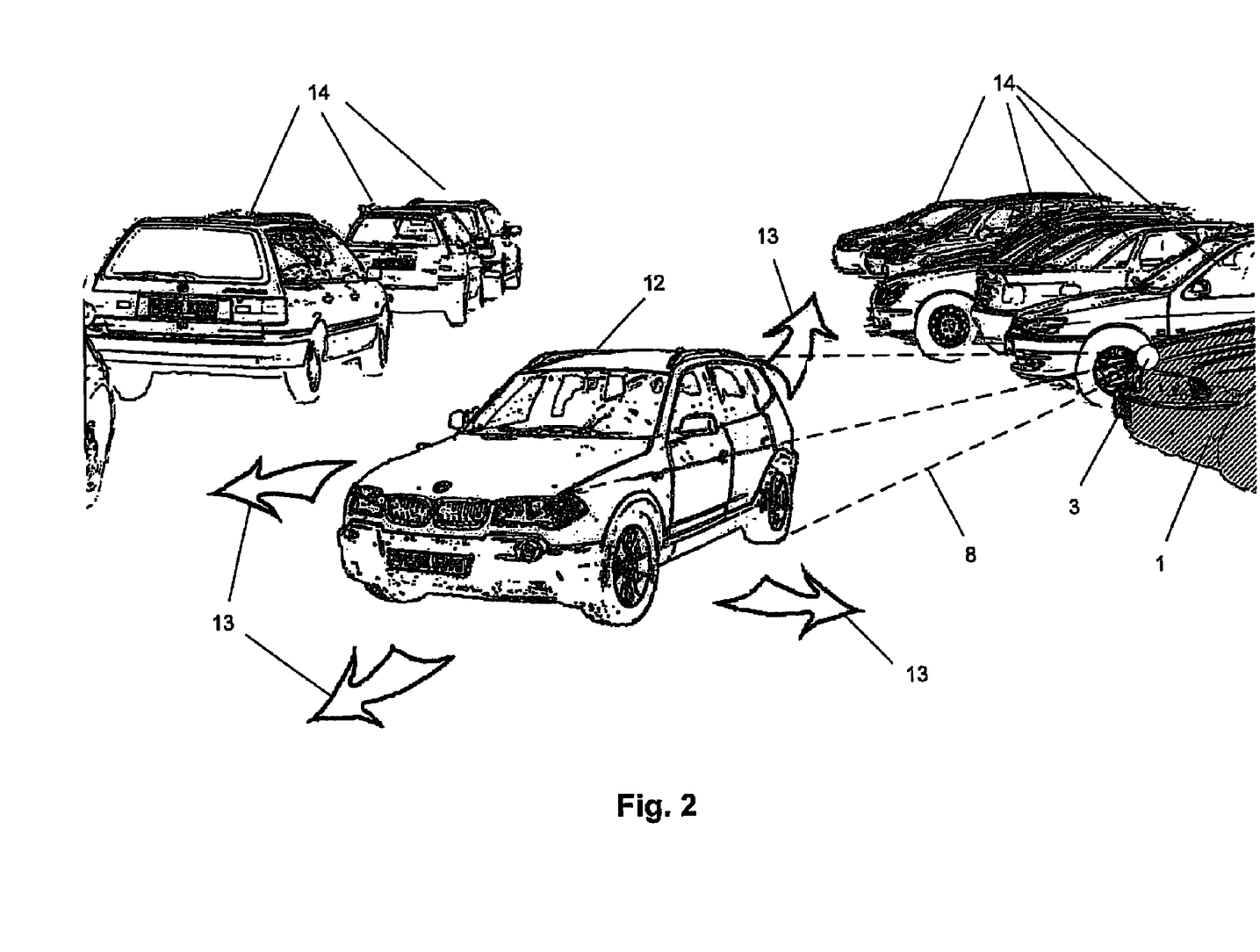
FIG. 2 is a schematic view of a setting environment, in which a motor vehicle generates a projection object constructed as a virtual motor vehicle by projection.

FIG. 2 shows an environmental setting in which a motor vehicle 1 generates a target object 12 for a driving maneuver by use of a projection device 3. The target object 12 is constructed as a three-dimensional virtual image of the motor vehicle 1 and is visible to all traffic participants (without optical auxiliary devices). The target object 12 is partly transparent, whereby (among other things) its virtual nature can be recognized also by other traffic participants. As a result of "projection beams" 8, it can be recognized—particularly for avoiding irritating other traffic participants—by which projection course (that is, by which motor vehicle) the projection object is projected (or from which vehicle). The movement intention, which accompanies the generating of such a target object according to a preferred embodiment of the present invention, can therefore also be assigned to the motor vehicle 1 by other traffic participants.

In order to bring the target object into a suitable position with respect to the motor vehicles 14 parked or driving in the environment, the driver of the motor vehicle can displace the position of the target object in the environment by use of an operating element. In this case, the auxiliary arrows 13 indicate the possible movement directions to the driver. Only when the target object is situated in a suitable position, will the driver of the vehicle 1 select this position as the desired position for the end of his driving maneuver. Only then will the driving maneuver be carried out (in the present case fully automatically) by the motor vehicle 1. At the end of the driving maneuver, the motor vehicle 1 will be in the selected desired position.

The driver of the projecting motor vehicle 1 can carry out the displacement of the target object 12 and the subsequent selection of a target position of the target object 12 as a desired position by an operating element in the motor vehicle interior, which here is constructed as a rotary/pressure-type button (but is not shown in the drawing). Further details for structuring the operating process are analogously contained in commonly owned German patent application 102006026092.9.

In contrast to the target object 12, the auxiliary arrows 13 are not (without optical auxiliary devices) visible to other traffic participants because they are generated by a laser in the infrared spectrum. However, for the driver of the motor vehicle 1, the auxiliary arrows 13 are visible by using the following auxiliary devices and processes. In order to make the auxiliary arrows 13 visible to the driver, the environmental setting is photographed by an infrared camera arranged at the motor vehicle 1. During a subsequent image processing, the projection objects, which are generated by light in the infrared region, are extracted. An image of the extracted projection objects (here, of the auxiliary arrows 13) is inserted by way of a head-up display into the windshield of the motor vehicle 1 such that, from the driver's view, the auxiliary arrows 13 appear to be superimposed in the environmental setting in the correct position. By way of other techniques, for example by using polarization filters, the auxiliary arrows 13 (then projected in the correspondingly changed manner) could also be made visible to the driver without any intermediately connected photographing and display.

For the observation of the at least one projection object generated according to the invention by the driver or other vehicle occupants, the windshield of the projecting vehicle can be utilized as an auxiliary optical device. For this purpose, the windshield can be further developed with special polarization characteristics. Thus, in the case of a suitable stereoscopic projection, projection objects can be generated which can be perceived three-dimensionally by the vehicle occupants (for example, according to the principle used in IMAX cinemas or similar methods). Such a windshield may also have the auxiliary optical devices (or itself represent the auxiliary optical device) by which projection objects which are essentially invisible or at least difficult to recognize for other traffic participants are made visible to the driver of the projecting motor vehicle.

In the case of the invention, a target object is generated in the environment of the motor vehicle, which marks the target position of a driving maneuver. For changing the target position, it may be advantageous for this target object to be movable by using operating elements of the motor vehicle only in correspondence with mathematically simulated physical laws of motion which are inherent to the motor vehicle. In this case a movement of a target object is such a change of the projection which creates the impression of a movement or is, for example, only symbolized. The latter can also take place by means of a discrete inserting or cutting-out of the target object in changed positions. A movement of the target object can, for example, consist of a flowing displacement or of a locally discrete change of the position of the target object and may be controlled by the driver or take place in an automated or partially automated manner depending on the embodiment. Such changes or displacements can be limited in correspondence with the physical laws of motion of the motor vehicle in its environment. Such an embodiment of the invention has the advantage that the implementability of a maneuver, including physical limitations inherent to each vehicle, for example, of a defined minimal turning circle and/or other chassis parameters, can be checked before the actual maneuver—for example, a park-in maneuver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of controlling an at least partly automatically implementable driving maneuver by which a motor vehicle is movable from an actual position into a desired position, the method comprising the acts of:
   generating a virtual target object in a target position for the motor vehicle in an environment outside of the motor vehicle by projecting using projection devices operatively configured on the motor vehicle;
   changing the target position as a function of operating actions of an operator of the motor vehicle, wherein the target object is also displaced in the environment of the motor vehicle; and
   selecting the changed target position via a selecting action of the operator and utilizing the changed target position as the desired position of the driving maneuver.

2. The method according to claim 1, wherein the target object marks a targeted end position of the driving maneuver.

3. The method according to claim 1, wherein the driving maneuver is a park-in maneuver, and further wherein the target object marks a targeted parking position.

4. The method according to claim 2, wherein the driving maneuver is a park-in maneuver, and further wherein the target object marks a targeted parking position.

5. The method according to claim 1, wherein the virtual target object has at least a planar construction.

6. The method according to claim 3, wherein the virtual target object has at least a planar construction.

7. The method according to claim 1, wherein the virtual target object has a three-dimensional construction.

8. The method according to claim 3, wherein the virtual target object has a three-dimensional construction.

9. The method according to claim 1, wherein the act of generating the virtual target object further comprises the acts of:
   generating the virtual target object such that the target object is essentially invisible to other traffic participants without using auxiliary optical devices; and
   making the virtual target object visible to a driver of the motor vehicle via auxiliary optical devices.

10. The method according to claim 3, wherein the act of generating the virtual target object further comprises the acts of:
   generating the virtual target object such that the target object is essentially invisible to other traffic participants without using auxiliary optical devices; and
   making the virtual target object visible to a driver of the motor vehicle via auxiliary optical devices.

11. The method according to claim 1, further comprising the acts of:
   generating at least one auxiliary object via the projection devices, the at least one auxiliary object providing information to the driver; and
   wherein the at least one auxiliary object is generated such that it is essentially invisible to other traffic participants without optical auxiliary devices, and is made visible to the driver of the motor vehicle via auxiliary optical devices.

12. The method according to claim 1, wherein an automatic interpretation of the environment of the motor vehicle is performed at least once in order to determine at least one potential target position.

13. The method according to claim 3, wherein an automatic interpretation of the environment of the motor vehicle is performed at least once in order to determine at least one potential target position.

14. The method according to claim 12, wherein as a result of the automatic interpretation of the environment of the motor vehicle, first and second target positions are determined, and further wherein the target object is displaced by an operating action from the first target position to the second target position.

15. The method according to claim 13, wherein as a result of the automatic interpretation of the environment of the motor vehicle, first and second target positions are determined, and further wherein the target object is displaced by an operating action from the first target position to the second target position.

16. The method according to claim 1, wherein the target object is operatively configured to represent a virtual motor vehicle in the environment of the motor vehicle.

17. The method according to claim 3, wherein the target object is operatively configured to represent a virtual motor vehicle in the environment of the motor vehicle.

18. The method according to claim 1, further comprising the act of marking at least one of a trajectory leading to an actually adjusted target position and a required maneuvering space in the environment of the motor vehicle via projection using the projection devices provided on the motor vehicle.

19. The method according to claim 2, further comprising the act of: marking at least one of a trajectory leading to an actually adjusted target position and a required maneuvering space in the environment of the motor vehicle via projection using the projection devices provided on the motor vehicle.

20. The method according to claim 18, further comprising the act of providing a driver of the motor vehicle with several possible trajectories to reach the target position from which the driver may select.

* * * * *